(No Model.)
W. M. COVENTRY.
STEAM COOKER.
No. 534,634. Patented Feb. 26, 1895.
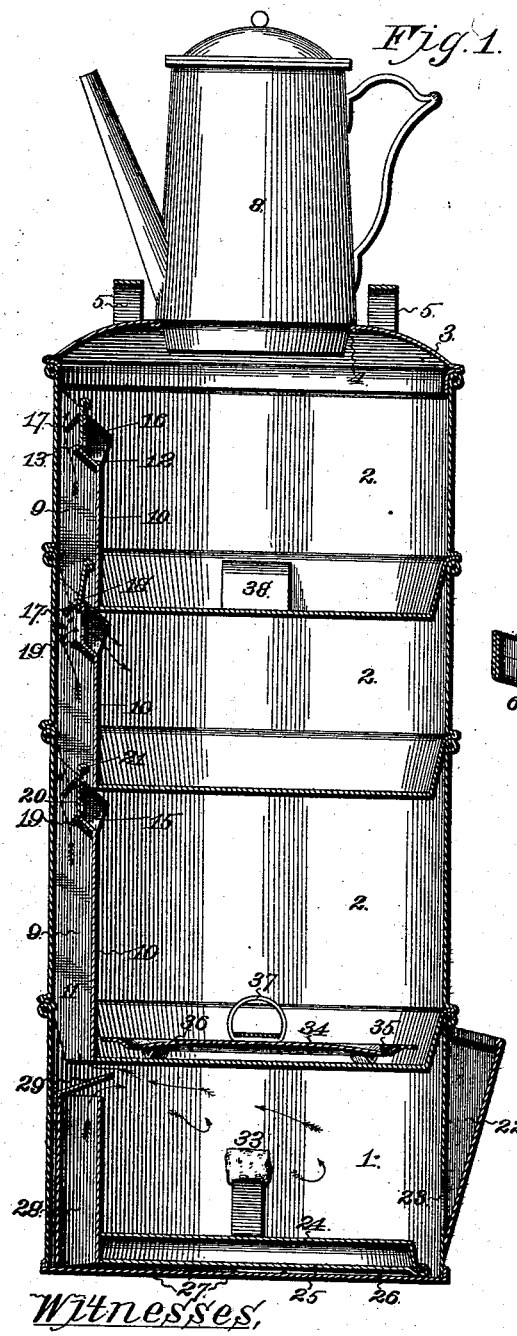
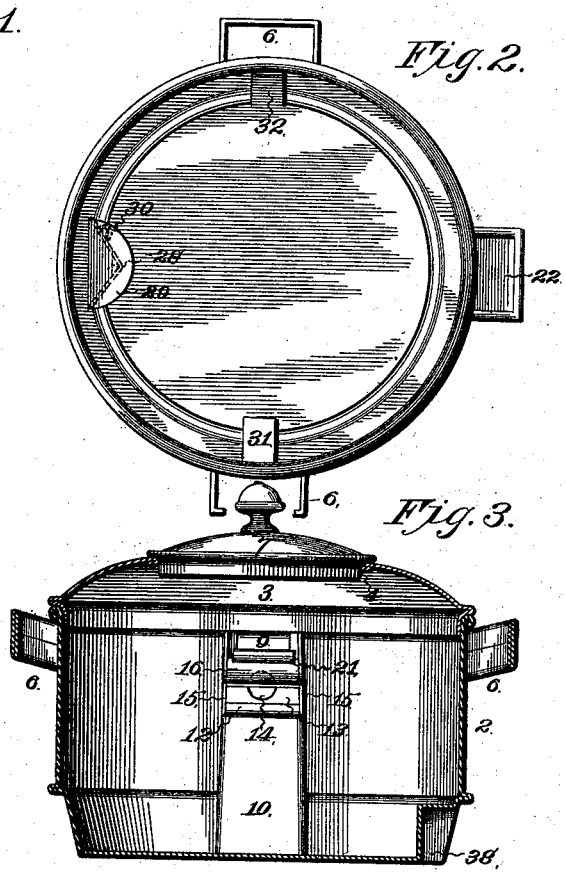
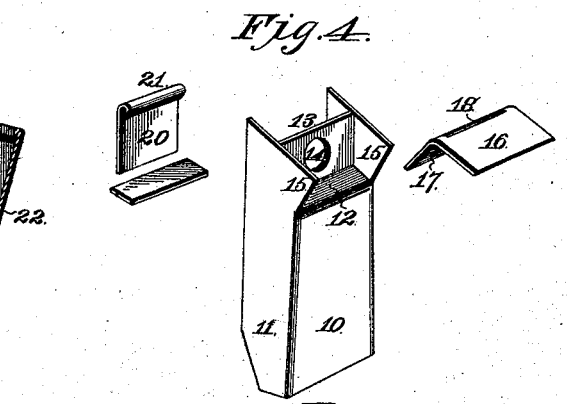
Witnesses,
Inventor,
W. M. Coventry,
By Higdon & Higdon
Att'ys.

UNITED STATES PATENT OFFICE.

WILLIAM M. COVENTRY, OF LONGTON, KANSAS.

STEAM-COOKER.

SPECIFICATION forming part of Letters Patent No. 534,634, dated February 26, 1895.

Application filed December 17, 1894. Serial No. 532,004. (No model.)

*To all whom it may concern:*

Be it known that I, WILLIAM M. COVENTRY, of Longton, Elk county, Kansas, have invented certain new and useful Improvements in Steam-Cookers, of which the following is a full, clear, and exact description, reference being had to the accompanying drawings, forming a part hereof.

My invention relates to steam cookers, and more particularly to that class of steam cookers comprising a steam-generating receptacle and a number of superimposed cooking receptacles, wherein various articles may be prepared for consumption simultaneously, and the object of the invention is to produce a device of this character which is simple and cheap of construction, and may be depended upon to generate steam, and therefore cook the articles in the various receptacles, in the shortest possible time.

With this object in view, the invention consists in certain novel and peculiar features of construction and combinations of parts, as will be hereinafter described and claimed.

In order that the invention may be fully understood, I will proceed to describe the same with reference to the accompanying drawings, in which—

Figure 1. represents a vertical section of a steam cooker embodying my invention. Fig. 2. is a top plan view of the steam-generating receptacle. Fig. 3. is a sectional view of one of the cooking receptacles taken in a plane at right-angles to the plane of the section shown in Fig. 1. Fig. 4. represents detail perspective views of parts to be hereinafter described.

In the said drawings, 1 designates a receptacle, which is adapted to rest upon the stove or other heating medium, and 2 designates a series of superimposed cooking receptacles, which rest upon the said receptacle 1, as shown. These receptacles are detachably connected, and being of the same construction, except in point of depth, their positions may be changed at will,—that is, any of said cooking-receptacles may occupy the highest, the lowest, or any intermediate position required. The top-most receptacle 2 is closed by a detachable lid or cover 3, which is provided with a central hole or aperture 4, and also with the upwardly projecting handles 5. Each receptacle is provided externally at opposite points with the handles 6. The hole or aperture 4 in the lid 3 is adapted to be closed by a detachable cap 7, or by a coffee or tea pot 8, so that coffee or tea may be boiled or steeped simultaneously with the cooking of other articles.

Each cooking receptacle 2 is provided with a vertical passage 9, which is rectangular in cross-section, and is formed conjointly by the inner side of said receptacle and a sheet-metal plate, which is bent longitudinally to form the wall 10 and the outwardly projecting walls 11, which are soldered or otherwise secured at their margins to the inner side of said receptacle. The lower ends of the walls 10 and 11 are also soldered at their point of communication with the opening in the bottom of the receptacle, which registers with and is of the same configuration as the said rectangular passage.

A suitable distance from its lower end, the wall 10 is bent to form the wall or portion 12, which extends outwardly and upwardly at an angle of about forty-five degrees and about one-third the width of the said rectangular passage. Said wall is then bent to form the vertically and upwardly projecting wall or portion 13, which is provided with a port or aperture 14. The side-walls 11 project a suitable distance above the wall or portion 12, and have their upper margins extending obliquely and parallel with said wall or portion 12. Said side-walls 11, where they project above the inclined wall or portion 12, are also extended inwardly a suitable distance beyond the plane of the wall 10, as at 15. A plate is now bent approximately at right-angles to form the wall 16 and the deflector 17, and said plate at the inner side of its angle rests and is secured upon the upper end of the wall or portion 13, and is also soldered or otherwise secured at its side-margins to and between the side-walls 11. It will thus be seen that I have provided at the upper end of each passage 9 a concentrating chamber or passage, which, if continued inwardly, would intersect the receptacle at its center. The object of this chamber will be hereinafter explained.

The angle of the wall 16 corresponds to that of the wall or portion 12, and the upper ends of the side-walls 11, while the deflector 17 extends downwardly and outwardly to a point contiguous to the inner side of said receptacle, but is far enough away from said side to permit of the passage of a suitable volume of steam.

The plate which forms the wall 16 and the deflector 17 is provided immediately outward of the wall or portion 13 with an elongated aperture or slot 18, and secured to the under side of said wall or portion 12, is a plate, which projects outwardly beyond the plane of the wall or portion 13 to form a supporting ledge or shoulder 19. It will be noted that this ledge or shoulder converges with the said wall or portion 13, so that the valve 20, which fits slidingly but snugly in the aperture or slot 18 shall, when moved downward, by its lower end entering between said converging ledge and wall, be forced and held tightly against the outer side of the wall or portion 13, and therefore will reliably close the port or aperture 14. When said valve is raised to open or expose said port or aperture, it is grasped by the handle-portion 21, and is then forced slightly out of its vertical plane, so that the frictional contact between it and the opposite sides of the aperture or slot 18 will maintain it in its raised position. When several of these receptacles are mounted one upon the other, their passages 9 register with each other, and the handle-portion 21 of the valve of each receptacle projects a slight distance upward into the passage of the receptacle immediately above, so that when it is desired to afford communication between any of said receptacles and its passage 9, the valve 20, projecting a suitable distance above, will not be in the way of the next section above, because it will simply project upward into the passage 9 of said last-mentioned section.

The steam-generating receptacle 1, is provided at one side with a mouth or spout 22, which communicates with the interior of said receptacle by way of the aperture 23 in the same. Within said receptacle is a hollow frustum-shaped vessel, which consists of an upper shell or section 24, and the lower shell or section 25. This shell or section 25 is concaved on its under side, and at its outer margins is connected with the outer margin of the shell or section 24, to form a water-tight joint. Between the concave plate 25 and the bottom of the receptacle 1, is formed a shallow space 26.

In the practical construction of the device, the connection or joint between the plate 25 and the bottom of the receptacle 1 will not be sufficiently closed to prevent the entrance of water from the body of the receptacle to said space 26, but in order to make positive the entrance of water to said space, I may provide a series of notches 27 in that portion of said plate which contacts with the bottom of the said receptacle. A V-shaped notch or cavity is formed in one side of said hollow vessel, and secured therein and communicating with the space 26, is a vertical tube 28, which is provided at its upper end with an inwardly and upwardly projecting deflector 29. At one side of said triangular tube 28, is arranged a vertical air-tube 30, which communicates at its lower end with the interior of said hollow vessel. In order to overcome any tendency in said vessel to float when water is introduced into said receptacle, an arm 31 projects inwardly from the side of the receptacle, and overlaps the upper margin of the vessel, and a spring-plate 32 overlaps the opposite upper margin of said vessel at its free and lower end, and is secured to the inner side of the vessel as at 33, or in any other suitable manner.

When cooking potatoes or such articles, in any of the receptacles, it is requisite that they shall not lie in the water produced by the condensation of the steam entering the said receptacle. Therefore I provide a plate 34, which is formed with an annular cavity or depression 35 in its upper side, and with drain holes or apertures registering with said cavities. This plate is supported a suitable distance above the bottom of the receptacle by a number of legs 36, and is provided with a handle 37, by which it is grasped when placed in or removed from said receptacle.

In the practical operation of the device, a quantity of water sufficient to submerge the air-vessel 24 is poured within the spout 22 and enters the receptacle 1 through the aperture 23. As this water finds its level said spout serves not only as a means for the introduction of water into said receptacle, but also serves as a gage by which the amount of water within said receptacle may be ascertained. Immediately the water enters the receptacle a quantity makes its way below the vessel 24 and fills the space 26, and being acted upon almost directly by the heating medium, is quickly converted into steam, which rises through the tube 28, and is directed by the deflector 29 toward the center of the receptacle. This is done to collect a large quantity of steam within said receptacle, so that it will rise in a considerable volume through the aligned apertures 9 of said superimposed receptacles. To aid in the quick conversion of the water into steam, the air-vessel is employed, which thus provides a large air-space between the water within the body of the receptacle and that below said vessel, so that the influence of one is not felt to any great extent by the other. The air within the said vessel being quickly heated, passes up through the tube 30 and enters the body of the receptacle, and its place is taken immediately by colder air, so that a constant circulation of air within said vessel 1 is maintained which tends to warm the water within the body of the receptacle, and also the bottom of the receptacle immediately above, as will be understood.

If it is desired to simultaneously cook articles in any particular receptacle and boil or steep coffee or tea, the valves of all of the receptacles below and above are closed, while the valve of said particular receptacle is opened. The coffee or tea pot is then placed operatively upon the lid or cover 3, as shown in Fig. 1. Of the steam now passing in a considerable volume from the vessel 1 in the direction indicated by the arrows, a large part is caused by the deflector 17 of the communicating passage to enter said receptacle, while the remainder passes up and enters the topmost receptacle, where it acts upon the coffee or tea, as will be understood.

In the passage of the steam from the passage 9 to the interior of the receptacle, it will be noted that it must first pass through the opening 14 and into the concentrating chamber hereinbefore referred to, and owing to the inclination of said concentrating-chamber, is directed in a continuous stream to the center of the vessel, and the article thus receiving the direct action of the steam when the heat is most intense, is thereby cooked much more rapidly than would be the case were the steam allowed to fill the receptacle before acting directly upon the articles to be cooked, as it would do, owing to its tendency to rise, were this concentrating-chamber not provided.

Should it be desired to cause all of the steam to enter a particular receptacle, its valve is raised, and the valves of all of the other receptacles are closed, with the exception of the topmost receptacle, as it makes no difference whether it is open or closed. The topmost receptacle is raised and rotated so that its passage 9 shall not register with the passage 9 of the receptacle immediately below, and the recess or cavity 38 in the lower side and end of the same is vertically above the valve of the receptacle immediately below. Said topmost receptacle is then lowered and fitted upon the receptacle next below, in the ordinary manner. This may be done, because the valve of the other receptacle engages the said cavity or recess 38, and communication is entirely cut off between said receptacles.

From the above description, it will be apparent that I have produced a steam cooker which is simple and cheap of construction, wherein steam may be generated and articles cooked in the shortest possible time, and whereby practically all of the steam may be caused to enter any particular receptacle desired.

Having thus described my invention, what I claim as new, and desire to secure by Letters Patent, is—

A steam cooker, comprising a steam-generating receptacle, and a number of superimposed cooking-receptacles, each provided with a vertical passage by bending a sheet of metal to form the inner walls 10 and 12 and the apertured wall 13, and the side-walls 11; and each provided with a concentrating-chamber by securing to said walls 11 and 13 the wall 16, a deflector extending outward and downward into the said vertical passage, a supporting inclined ledge or shoulder, and a sliding valve engaging an aperture at the junction of the wall 16 and the said deflector, and resting upon said inclined ledge or shoulder, substantially as set forth.

In testimony whereof I affix my signature in the presence of two witnesses.

WILLIAM M. COVENTRY.

Witnesses:
   M. R. REMLEY,
   G. Y. THORPE.